(12) United States Patent
Tsujita

(10) Patent No.: US 11,794,531 B2
(45) Date of Patent: Oct. 24, 2023

(54) TRANSMITTER WITH HOLLOW BOX FOR WHEEL ASSEMBLIES

(71) Applicant: PACIFIC INDUSTRIAL CO., LTD., Ogaki (JP)

(72) Inventor: Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 645 days.

(21) Appl. No.: 16/306,642

(22) PCT Filed: Oct. 26, 2017

(86) PCT No.: PCT/JP2017/038777
§ 371 (c)(1),
(2) Date: Apr. 30, 2021

(87) PCT Pub. No.: WO2019/082353
PCT Pub. Date: May 2, 2019

(65) Prior Publication Data
US 2021/0268848 A1 Sep. 2, 2021

(51) Int. Cl.
*B60C 23/04* (2006.01)
*G01L 19/00* (2006.01)
(Continued)

(52) U.S. Cl.
CPC .......... *B60C 23/0408* (2013.01); *G01L 13/02* (2013.01); *G01L 15/00* (2013.01); *G01L 17/00* (2013.01); *G01L 19/0092* (2013.01)

(58) Field of Classification Search
CPC ............ B60C 23/0408; B60C 23/0496; B60C 23/061; B60C 23/0494; B60C 23/0416; B60C 23/0433; B60C 2/0493; B60C 19/00; B60C 23/04; B60C 23/041; B60C 23/0462; B60C 23/0411; B60C 23/20; B60C 23/0444; B60C 23/0479; B60C 11/24;
(Continued)

(56) References Cited

FOREIGN PATENT DOCUMENTS

EP 0288389 A1 * 10/1988
JP 5722027 S 2/1982
(Continued)

OTHER PUBLICATIONS

International Search Report for PCT/JP2017/038777 dated Jan. 30, 2018 (2 pages).

*Primary Examiner* — Andre J Allen
(74) *Attorney, Agent, or Firm* — CANTOR COLBURN LLP

(57) ABSTRACT

A transmitter arranged in a tire includes a transmitting section, which has a terminal, and a pressure switch. The pressure switch includes a hollow box and a passage that causes an interior of the box and an interior of the tire to communicate with each other. The box includes a conductive deforming portion, which is separate from the terminal when the difference between the pressure in the box and the pressure in the tire is less than a predetermined value and is elastically deformed to contact the terminal when the pressure in the box is higher than the pressure in the tire at least by the predetermined value. The transmitting section transmits a warning signal that causes a tire pressure warning device to issue a warning in response to contact between the deforming portion and the terminal.

5 Claims, 8 Drawing Sheets

(51) Int. Cl.
*G01L 17/00* (2006.01)
*G01L 13/02* (2006.01)
*G01L 15/00* (2006.01)

(58) Field of Classification Search
CPC ... B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

FOREIGN PATENT DOCUMENTS

| | | |
|---|---|---|
| JP | 2505125 | 7/1992 |
| JP | 2000118214 A | 4/2000 |
| JP | 2004330887 A | 11/2004 |
| JP | 2009173148 A | 8/2009 |
| JP | 201491344 A | 5/2014 |

* cited by examiner

TRANSMITTER WITH HOLLOW BOX FOR WHEEL ASSEMBLIES

TECHNICAL FIELD

The present invention relates to a transmitter adapted to be attached to each one of the wheel assemblies of a vehicle.

BACKGROUND ART

Patent Document 1, for example, describes a transmitter adapted to be arranged in a vehicle having wheel assemblies. A tire pressure monitoring device described in this publication includes transmitters and a receiver. Each of the transmitters is mounted in one of the wheel assemblies. Each transmitter includes a pressure sensor, a controller, and a transmitting section. The pressure sensor detects the pressure in the tire (the tire internal pressure). The controller intermittently obtains data of the tire pressure detected by the pressure sensor. The transmitting section transmits a data signal carrying the pressure data to the receiver. The receiver receives data signals from the transmitters arranged in the respective wheel assemblies and thus obtains the fact that the pressure in the tire has abruptly dropped or is excessively low.

PRIOR ART DOCUMENT

Patent Document

Patent Document 1: Japanese Laid-Open Patent Publication No. 2014-91344

SUMMARY OF THE INVENTION

Problems that the Invention is to Solve

In a case in which a controller obtains the pressure data intermittently, each period between obtainment of pressure data and subsequent obtainment of pressure data elapses without obtainment of pressure data. That is, there are periods in which the receiver cannot obtain the tire pressures. If, in one of such periods, a sudden pressure drop occurs in any one of the tires, the receiver cannot obtain this sudden pressure drop until the pressure data is obtained.

Accordingly, it is an objective of the present invention to provide a transmitter capable of enabling a tire pressure warning device to issue a warning immediately after a sudden pressure drop occurs in a tire.

Means for Solving the Problems

To achieve the foregoing objective, a transmitter adapted to be arranged in a tire to cause a tire pressure warning device to issue a warning is provided. The transmitter includes a transmitting section, which has a terminal, and a pressure switch. The pressure switch includes a hollow box and a passage that causes an interior of the box and an interior of the tire to communicate with each other. The box includes a conductive deforming portion, which is configured to be separate from the terminal of the transmitting section when a difference between a pressure in the box and a pressure in the tire is less than a predetermined value and to be elastically deformed to contact the terminal when the pressure in the box is higher than the pressure in the tire at least by the predetermined value. The transmitting section is configured to transmit a warning signal that causes the tire pressure warning device to issue a warning in response to contact between the deforming portion and the terminal.

The interior of the box and the interior of the tire communicate with each other through the passage. Therefore, when tire pressure variation is small, it is assumed that the pressure in the box is equal to that in the tire. When a sudden pressure drop occurs in the tire, the pressure in the box drops in correspondence with the pressure in the tire. In this state, the passage functions as an orifice to limit gas discharge from the box through the passage. The pressure in the box thus drops more slowly than the pressure in the tire. As a result, in a case of a sudden pressure drop in the tire, the pressure in the box becomes temporarily higher than the pressure in the tire. When the pressure in the box is higher than the pressure in the tire at least by the predetermined value, the deforming portion elastically deforms and comes into contact with the terminal. This causes the transmitting section to transmit a warning signal to the tire pressure warning device, thus causing the tire pressure warning device to issue a warning. As the time elapses and the pressure in the box and the pressure in the tire become lower, the deforming portion elastically restores its original shape and thus separates from the terminal. Such transmission of the warning signal in response to elastic deformation of the deforming portion causes the warning device to issue a warning immediately after the sudden pressure drop in the tire.

The above transmitter may include a flow rate reducing portion, which is configured to, in a state in which the pressure in the tire is lower than the pressure in the box, cause a flow rate of gas discharged from the box through the passage to be smaller when the deforming portion and the terminal are in contact with each other than when the deforming portion and the terminal are separate from each other. As one example, the passage is provided in the deforming portion, and the terminal is configured to limit the flow rate of the gas discharged from the box through the passage when the terminal contacts the deforming portion.

With this configuration, the flow rate of the gas discharged from the box through the passage is reduced after the deforming portion and the terminal come into contact with each other. This hampers reduction in the difference between the pressure in the tire and the pressure in the box, thus prolonging the time for which the deforming portion is in contact with the terminal. As a result, the time for which the warning signal is transmitted is prolonged.

The above transmitter may include a flow rate increasing portion, which is configured to, in a state in which the pressure in the tire is lower than the pressure in the box, cause a flow rate of gas discharged from the box through the passage to be smaller when the deforming portion and the terminal are separate from each other than when the deforming portion and the terminal are in contact with each other.

With this configuration, in correspondence with the difference between the pressure in the tire and the pressure in the box, the deforming portion repeatedly comes into contact with and separates from the terminal. Such contact and separation of the deforming portion with respect to the terminal occur at an interval that becomes shorter as the dropping amount of the pressure in the tire per unit time becomes greater. The warning signal is transmitted each time the deforming portion comes into contact with the terminal. With reference to the interval at which the tire pressure warning device receives the warning signal, the tire pressure warning device obtains the degree of the problem that has occurred in the tire.

Effects of the Invention

The present invention enables the warning device to issue a warning immediately after a sudden pressure change in the tire.

MODES FOR CARRYING OUT THE INVENTION

A transmitter according to one embodiment will now be described.

Figure 1:
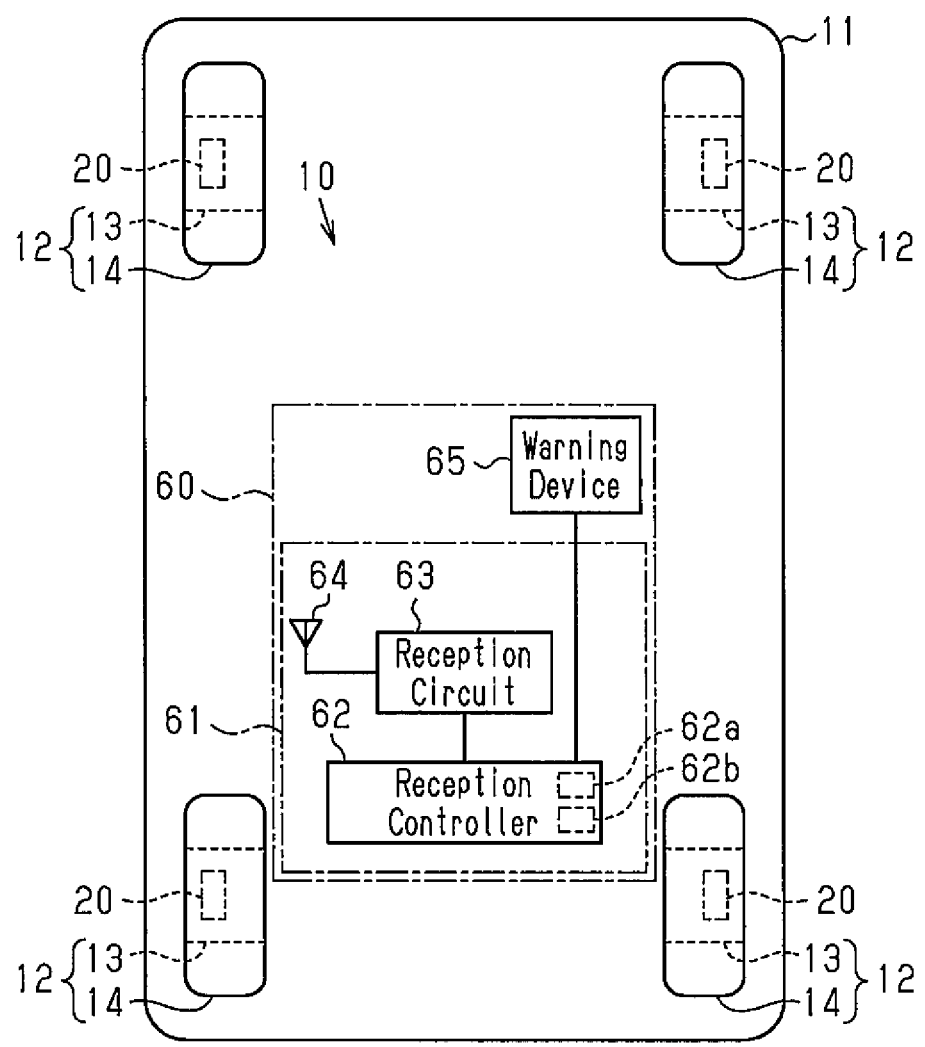
FIG. 1 is a schematic diagram representing the configuration of a vehicle.

As shown in FIG. 1, a tire pressure monitoring device 10 includes transmitters 20 and a tire pressure warning device 60. Each of the transmitters 20 is attached to one of four wheel assemblies 12 of a vehicle 11. The tire pressure warning device 60 is arranged in the body of the vehicle 11. Each of the wheel assemblies 12 includes a wheel 13 and a tire 14. The tire 14 is mounted on the wheel 13. The tire pressure warning device 60 includes a receiver 61 and a warning device 65.

Figure 2:
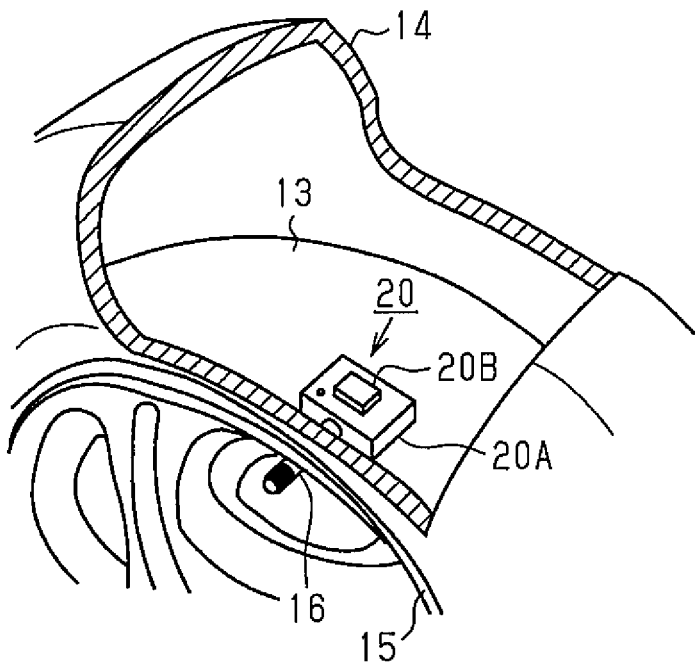
FIG. 2 is a perspective view showing a transmitter attached to a wheel.

As shown in FIG. 2, each of the transmitters 20 is integrated with a tire valve 16 mounted on a rim 15 of one of the wheels 13. To arrange the transmitter 20 in the internal space of the tire 14, the transmitter 20 is attached to the wheel 13, on which the tire 14 is mounted.

Each transmitter 20 includes a normal-time transmission device 20A and a sudden-pressure-change transmission device 20B. The normal-time transmission device 20A and the sudden-pressure-change transmission device 20B are integrated with each other.

Figure 3:
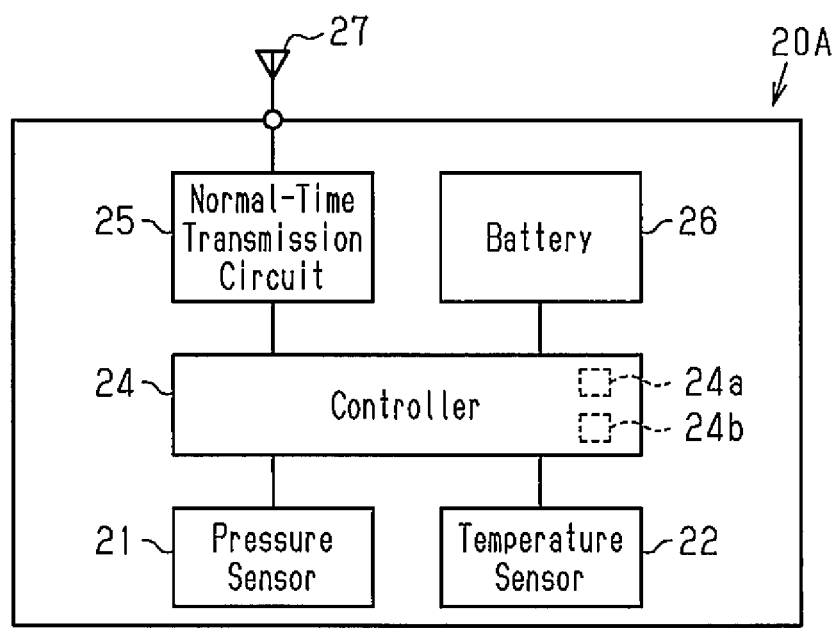
FIG. 3 is a schematic diagram representing the configuration of a normal-time transmission device.

As shown in FIG. 3, the normal-time transmission devices 20A includes a pressure sensor 21, a temperature sensor 22, a controller 24, a normal-time transmission circuit 25, an antenna 27, and a battery 26. The normal-time transmission device 20A operates using the battery 26. The controller 24 controls the operation of the normal-time transmission device 20A in an integrated manner. The pressure sensor 21 detects the pressure in the corresponding tire 14 (the tire internal pressure) and outputs the pressure data of the tire 14 obtained through such detection to the controller 24. The temperature sensor 22 detects the temperature in the corresponding tire 14 (the tire internal temperature) and outputs the temperature data of the tire 14 obtained through such detection to the controller 24.

The controller 24 is constituted by a microcomputer including a CPU 24a, a memory section 24b (such as a RAM or a ROM), and a timer. The memory section 24b registers ID codes that carry ID information specific to the respective normal-time transmission devices 20A. The ID codes represent information used to enable the receiver 61 to identify each of the normal-time transmission devices 20A. The controller 24 generates pressure data, temperature data, and data including the ID code and outputs the data to the normal-time transmission circuit 25. The normal-time transmission circuit 25 modulates the data provided by the controller 24 to generate a data signal (an RF signal) and wirelessly transmits the data signal through the antenna 27. The data signal is transmitted as a signal of an RF band (such as the 315 MHz band or 434 MHz band).

The controller 24 may include dedicated hardware (an application specific integrated circuit: ASIC) that executes at least part of the various processes. That is, the controller 24 may be circuitry including 1) one or more processors that operate according to a computer program (software), 2) one or more dedicated hardware circuits such as an ASIC, or 3) a combination thereof. The processor includes a CPU and memories such as a RAM and ROM. The memories store program codes or instructions configured to cause the CPU to execute processes. The memories, or computer readable media, include any type of media that are accessible by general-purpose computers and dedicated computers.

Figure 4:
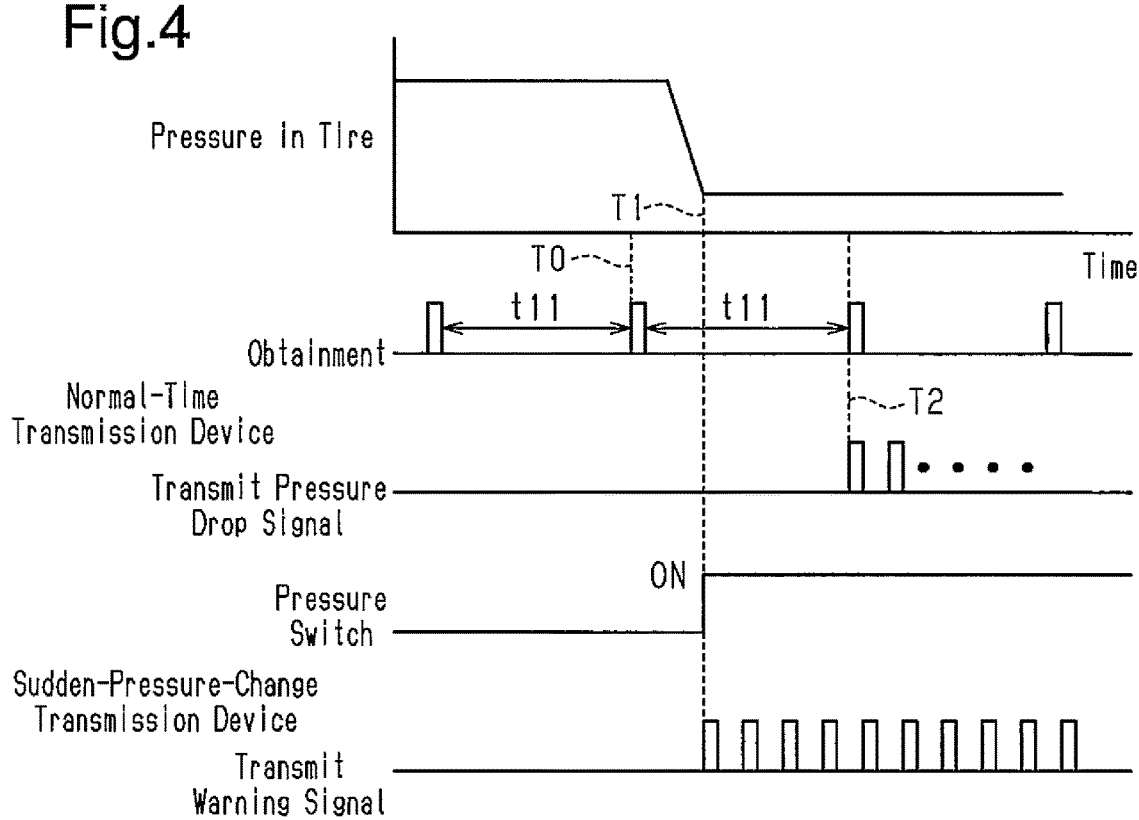
FIG. 4 is a timing diagram representing the relationship among the pressure in the tire, the pressure drop signal transmitted by the normal-time transmission device, and the warning signal transmitted by a sudden-pressure-change transmission device.

As shown in FIG. 4, the controller 24 obtains the data of the pressure detected by the pressure sensor 21 intermittently at predetermined obtainment intervals t11. The obtainment interval t11 is, for example, from ten seconds to several tens of seconds. The controller 24 performs normal-time transmission, in which the data signal is transmitted at predetermined intervals. If the pressure the corresponding tire 14 abruptly drops or is excessively low, the controller 24 determines that a problem has occurred in the tire 14 and transmits a pressure drop signal. The pressure drop signal may be a signal similar to the data signal or a signal of any format such as a signal carrying a warning flag.

Figure 5:
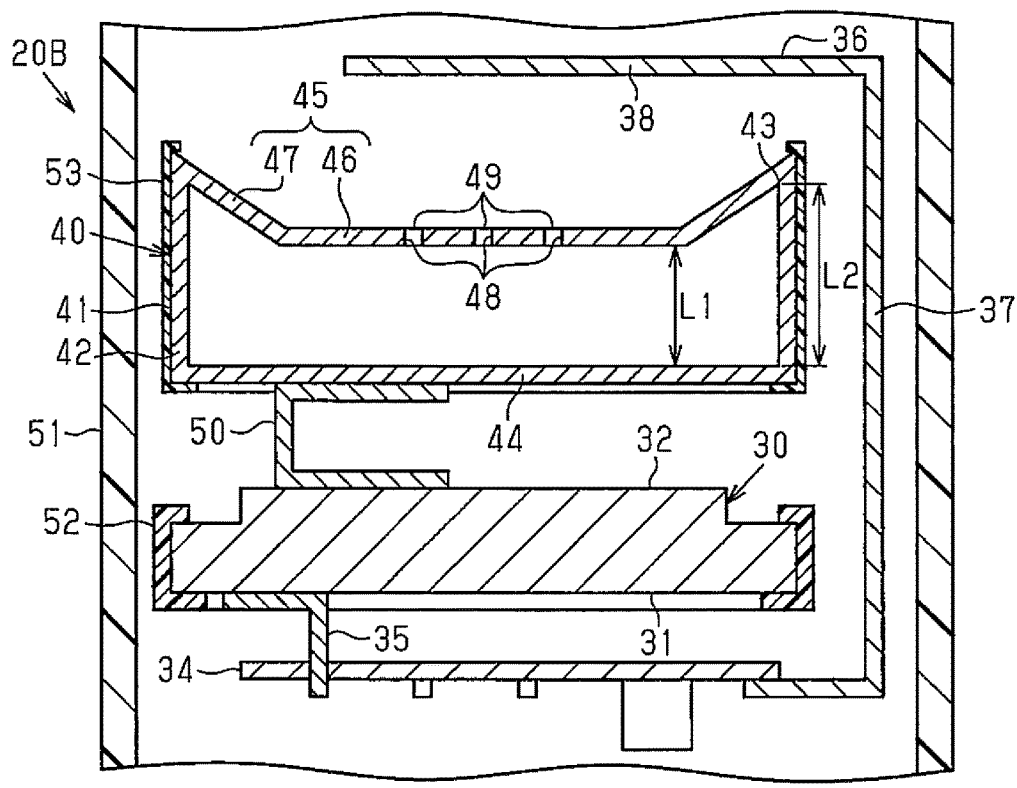
FIG. 5 is a cross-sectional view showing a sudden-pressure-change transmitter.

As shown in FIG. 5, each of the sudden-pressure-change transmission devices 20B includes a battery 30, a transmission circuit 34, a pressure switch 40, a conductive member 50 made of metal, and a case 51. The case 51 accommodates the listed components. The transmission circuit 34, the battery 30, and the pressure switch 40 are stacked together.

The battery 30 is shaped like a disk. The battery 30 serves as the electric power supply for the transmission circuit 34. When supplied with electric power, the transmission circuit 34 transmits a predetermined warning signal. The warning signal must at least be a signal carrying an ID code. The transmission circuit 34 continuously transmits the warning signal as long as the transmission circuit 34 is supplied with electric power from the battery 30. Specifically, the ID code carried by the warning signal may be an ID code that is either identical with or different from the ID code of the normal-time transmission device 20A integrated with the sudden-pressure-change transmission device 20B. The transmission circuit 34 includes two terminals 35, 36. In the present embodiment, the terminals 35, 36 are electric-power supplying terminals.

The pressure switch 40 includes a box 41 made of metal. The box 41 is hollow and includes a cylindrical peripheral wall 42, a wall section 44, and a deforming portion 45. The wall section 44 is arranged on one of the opposite ends (the opposite axial ends) of the peripheral wall 42. The deforming portion 45 is arranged on the other one of the opposite ends of the peripheral wall 42. The wall section 44 has a circular and flat plate-like shape.

The deforming portion 45 is arranged to dent in the axial direction of the peripheral wall 42 from a peripheral edge 43 of the peripheral wall 42. The deforming portion 45 includes a circular contact portion 46 and a retractable portion 47. The retractable portion 47 connects the peripheral edge of the contact portion 46 to the peripheral edge 43 of the peripheral wall 42. The dimension L1 from the contact portion 46 to the wall section 44 in the axial direction of the peripheral wall 42 is smaller than the dimension L2 from the peripheral edge 43 to the wall section 44 in the axial direction of the peripheral wall 42. That is, the deforming portion 45 is located on the inner side of the peripheral wall 42.

The pressure switch 40 includes multiple passages 48. The multiple passages 48 allow the interior and the exterior of the box 41 to communicate with each other and extend through the contact portion 46.

The transmission circuit 34 serving as a transmitting section and an end face 31 of the battery 30 face each other. Of the two terminals 35, 36, the terminal 35 is joined to the end face 31 of the battery 30. An end face 32 of the battery 30 opposite to the end face 31 and the wall section 44 of the pressure switch 40 face each other. The conductive member 50 is arranged between the battery 30 and the pressure switch 40. The conductive member 50 is joined to the end face 32 of the battery 30 and the wall section 44 of the pressure switch 40.

Of the two terminals 35, 36 of the transmission circuit 34, the terminal 36, not the terminal 35, has a section that faces the deforming portion 45 of the pressure switch 40. Specifically, the terminal 36 includes a first section 37 and a second section 38. The first section 37 extends along the battery 30 and the pressure switch 40 from the transmission circuit 34. The second section 38 extends from the first section 37 to a position facing the contact portion 46.

The second section 38 is arranged in a separate state from the contact portion 46 of the pressure switch 40. The second section 38 faces the section of the contact portion 46 in which the passages 48 are arranged. Specifically, the second section 38 faces openings 49 of the passages 48. The openings 49 are located on the outer side of the box 41.

The case 51 is made of an insulating material such as plastic. The case 51 includes a battery holding portion 52 and a switch holding portion 53. The battery holding portion 52 holds the battery 30, and the switch holding portion 53 holds the pressure switch 40. The battery holding portion 52 is arranged not to hamper expansion and contraction of the battery 30 at the time the battery 30 is used. The expansion and contraction of the battery 30 is absorbed through elastic deformation of the conductive member 50. This restricts displacement of the pressure switch 40 caused by the expansion and contraction of the battery 30.

Although not illustrated, the case 51 has a hole that allows the interior and the exterior of the case 51 to communicate with each other. For purposes of illustration, the pressure in the case 51 is assumed to be always equal to the pressure in the tire 14 in the following description.

As has been described, the passages 48 allow the interior and the exterior of the box 41 to communicate with each other. As a result, the pressure in the box 41 varies in correspondence with pressure variation in the tire 14. If the pressure variation in the tire 14 is small, the pressure in the tire 14 is assumed to be equal to the pressure in the box 41. When the pressure in the tire 14 and the pressure in the box 41 are equal, the deforming portion 45 is located on the inner side of the peripheral wall 42 and the contact portion 46 and the terminal 36 are maintained in the separate state.

Figure 6:
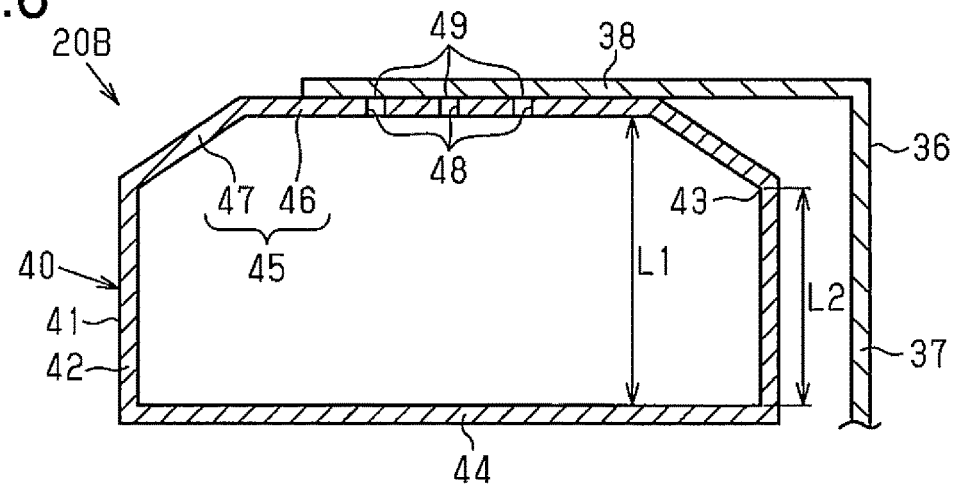
FIG. 6 is a cross-sectional view schematically representing the relationship between a deforming portion of a pressure switch and a terminal at the time of elastic deformation of the deforming portion.

As shown in FIG. 6, the deforming portion 45 of the pressure switch 40 is elastically deformed by the pressure difference between the interior and the exterior of the box 41. Specifically, the retractable portion 47 of the deforming portion 45 is elastically deformed when the pressure in the box 41 is higher than the pressure in the exterior of the box 41 (the pressure in the tire 14) at least by the amount corresponding to a predetermined value. The deforming portion 45 elastically deforms to project outward with respect to the peripheral edge 43 of the peripheral wall 42 in the axial direction of the peripheral wall 42. Such elastic deformation of the deforming portion 45 causes the dimension L1 to be longer than the dimension L2. The contact portion 46 and the terminal 36 come into contact with each other through elastic deformation of the deforming portion 45. The transmission circuit 34 is thus supplied with electric power and transmits the warning signal.

The aforementioned "predetermined value" can be set to any value in such a range in which deformation of the deforming portion 45 of the pressure switch 40 is ensured at the time of a sudden pressure change. The sudden pressure change represents a pressure drop exceeding a pressure variation amount (per unit time) at the time of natural pressure drop caused by traveling of the vehicle. The sudden pressure change occurs when, for example, the tire 14 bursts. During the sudden pressure change, in which the pressure in the tire 14 suddenly drops, each of the passages 48 functions as an orifice such that the pressure in the box 41 drops more slowly than the pressure in the tire 14. As a result, at the time of the sudden pressure change, a pressure difference is brought about between the pressure in the tire 14 and the pressure in the box 41. The pressure difference causes elastic deformation of the deforming portion 45.

Considering the above-described condition, the pressure difference between the interior of the tire 14 and the interior of the box 41 caused by bursting of the tire 14 under recommended pressure is estimated. The "predetermined value" is set such that the deforming portion 45 is elastically deformed by a pressure difference smaller than the estimated pressure difference.

The pressure difference between the interior and the exterior of the box 41 necessary for elastically deforming the deforming portion 45 changes depending on the shape of the deforming portion 45, the material of the deforming portion 45, the dimensions of the deforming portion 45, the cross-sectional flow area of the passages 48, and the volume of the box 41. The deforming portion 45 is provided such that "predetermined value" is satisfied. This enables elastic deformation of the deforming portion 45 when the pressure in the box 41 is higher than the pressure in the tire 14 at least by the amount corresponding to the predetermined value.

As has been described, the deforming portion 45 is configured to be elastically deformed when the pressure in the box 41 is higher than the pressure in the tire 14 at least by the amount corresponding to the predetermined value. However, tolerance may cause a slight error in the pressure difference necessary for elastic deformation of the deforming portion 45. The "predetermined value" tolerates such slight errors caused by tolerance.

When the deforming portion 45 is elastically deformed by the pressure difference between the interior and the exterior of the box 41, the openings 49 of the passages 48 are blocked by the terminal 36. The gas in the box 41 is discharged through the gap between the openings 49 and the terminal 36. By discharging the gas from the box 41 through the passages 48, the pressure in the box 41 drops slowly.

By blocking the openings 49 of the passages 48 with the terminal 36, the opening area of each opening 49 becomes smaller than that when the openings 49 of the passages 48 are not blocked by the terminal 36. This limits the flow rate of the gas discharged through the passages 48. In other words, in the state in which the pressure in the tire 14 is lower than the pressure in the box 41, the flow rate of the gas discharged from the box 41 through the passages 48 is smaller when the deforming portion 45 and the terminal 36 are in contact with each other than when the deforming portion 45 and the terminal 36 are separate from each other. In the present embodiment, the terminal 36 functions as a flow rate reducing portion. Specifically, if the gap between the openings 49 and the terminal 36 and the passages 48 are collectively regarded as a passage that allows the interior of the box 41 and the interior of the tire 14 to communicate with each other, the cross-sectional flow area of this passage is reduced by the flow rate reducing portion through contact between the deforming portion 45 and the terminal 36.

As the difference between the pressure in the tire 14 and the pressure in the box 41 becomes smaller, the elastic force of the deforming portion 45 restores the original shape of the deforming portion 45. The deforming portion 45 and the terminal 36 thus separate from each other, thus ending electric power supply to the transmission circuit 34. That is, when a sudden pressure change occurs in the tire 14, the transmission circuit 34 is temporarily supplied with electric power.

Specifically, the time for which elastic deformation of the deforming portion 45 is maintained, which is the time for which the deforming portion 45 and the terminal 36 are in contact with each other, may be adjusted as needed by changing the shape of the deforming portion 45, the material of the deforming portion 45, the dimensions of the deforming portion 45, or the flow rate of the gas discharged through the passages 48. The flow rate of the gas discharged through the passages 48 may be adjusted by changing the cross-sectional flow area of the passages 48 and the opening area of each opening 49. In the present embodiment, the shape of the deforming portion 45 is set to maintain elastic deformation of the deforming portion 45 for the time corresponding to the obtainment interval t11 or longer when the tire 14 bursts with the pressure in the tire 14 maintained at the recommended pressure. Specifically, if the box 41 has multiple passages 48 as in the present embodiment, the cross-sectional flow area refers to the sum of the cross-sectional flow areas of the passages 48.

Figure 7:
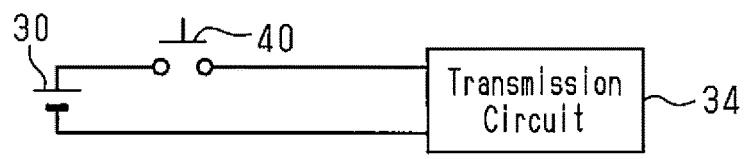
FIG. 7 illustrates an equivalent circuit representing the sudden-pressure-change transmission device.

As shown in FIG. 7, the pressure switch 40 is turned on and off depending on the pressure difference. In this manner, the pressure switch 40 functions as a mechanical switch that switches between supplying electric power to the transmission circuit 34 and blocking such supply of the electric power.

As shown in FIG. 1, the receiver 61 includes a reception controller 62, a reception circuit 63, and a reception antenna 64. The reception controller 62 of the receiver 61 is connected to a warning device 65. The reception controller 62 is constituted by a microcomputer including a CPU $62a$ and a reception-side memory section $62b$ (a ROM or a RAM) and controls the operation of the receiver 61 in an integrated manner. The reception-side memory section $62b$ memorizes the ID codes of the transmitters 20. If the normal-time transmission devices 20A use ID codes different from those of the corresponding sudden-pressure-change transmission devices 20B, the respective ID codes are memorized.

The reception circuit 63 receives the data signals, the pressure drop signals, and the warning signals that are transmitted by the transmitters 20 through the reception antenna 64. The reception circuit 63 demodulates the data signals, the pressure drop signals, and the warning signals and outputs the signals to the reception controller 62.

Based on the data signals, the reception controller 62 obtains the states of the tires 14, such as the pressure in the tire 14 and the temperature in the tire 14. The reception controller 62 also determines whether a problem has occurred in the tire 14 based on the pressure drop signal and warning signal. If the tire 14 has a problem, the reception controller 62 issues a warning by means of the warning device 65.

The warning device 65 may be either a type that issues a warning using sound and vibration, illumination, or a display device that displays the fact that a problem has occurred in the tire 14.

An operation of the transmitter 20 of the present embodiment will now be described.

As shown in FIG. 4, it is assumed that the tire 14 bursts at a point in time T1, thus causing a sudden pressure change in the tire 14. The controller 24 obtains the pressure data at a point in time T0 and then at a point in time T2 in the subsequent cycle. The point in time T1 is between the point in time T0 and the point in time T2.

The controller 24 detects the sudden pressure change when obtaining the pressure data at the point in time T2, later than the point in time T1. In response to such detection, the controller 24 transmits the pressure drop signal. Despite the sudden pressure change, the period from the point in time T1 to the point in time T2 elapses without transmission of the pressure drop signal.

At the point in time T1, at which the sudden pressure change occurs, the deforming portion 45 of the pressure switch 40 comes into contact with the terminal 36. This causes the transmission circuit 34 to transmit the warning signal. Since the time necessary for elastic deformation of the deforming portion 45 is short, the warning signal is transmitted immediately after the sudden pressure change. In other words, the warning signal is transmitted sooner than the pressure drop signal.

As has been described, the normal-time transmission device 20A intermittently obtains the pressure data. Therefore, even when a sudden pressure change occurs, the normal-time transmission device 20A cannot detect the sudden pressure change unless the pressure data is obtained.

This may delay detection of the sudden pressure change. Specifically, there may be cases in which, after the occurrence of a sudden pressure change, the controller 24 consumes time substantially equal to the obtainment interval t11 before detection of the sudden pressure change.

In contrast, the sudden-pressure-change transmission device 20B elastically deforms the deforming portion 45 in response to the pressure difference greater than or equal to the predetermined value. The deforming portion 45 thus comes into contact with the terminal 36 and transmits the warning signal. In other words, the pressure difference mechanically turns on the switch connecting the transmission circuit 34 to the battery 30 such that the warning signal is transmitted. As a result, the warning signal is transmitted immediately after the sudden pressure change.

As the time elapses and the pressure difference between the interior and the exterior of the box 41 becomes smaller, the sudden-pressure-change transmission device 20B stops transmitting the warning signal. Since elastic deformation of the deforming portion 45 is maintained for the time corresponding to the obtainment interval t11 or longer, the normal-time transmission device 20A will have transmitted the pressure drop signal by the point in time at which transmission of the warning signal ends. Therefore, even without transmitting the warning signal, the receiver 61 continuously obtains the fact that a problem has occurred in the tire 14.

Figure 8:
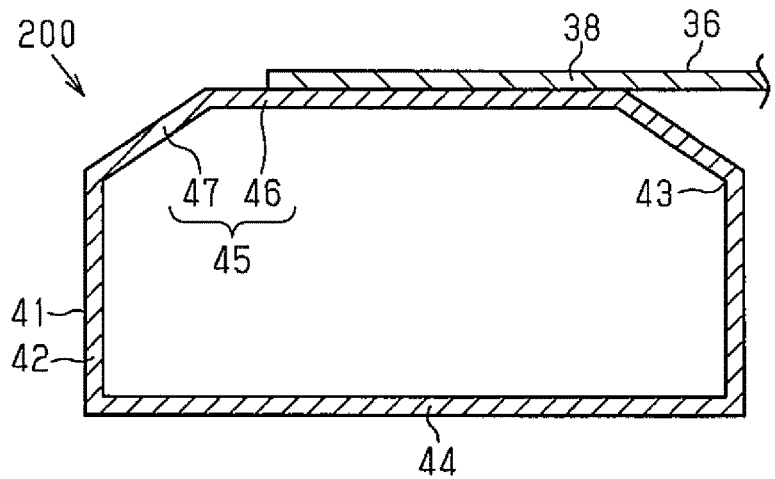
FIG. 8 is a cross-sectional view schematically showing a pressure switch of a comparative example.
Figure 9:
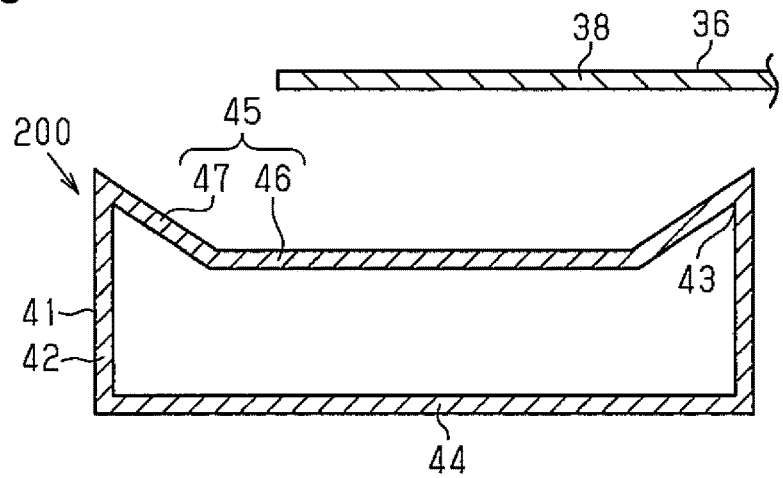
FIG. 9 is a cross-sectional view schematically showing the pressure switch of the comparative example.

Alternatively, as shown in FIG. 8, a pressure switch that has the box 41 of the present embodiment but without the passages 48 may be used as a pressure switch 200. When under atmospheric pressure, the deforming portion 45 of the pressure switch 200 projects on the outer side of the peripheral wall 42 and is thus in contact with the terminal 36. If the pressure switch 200 is arranged in the tire 14, the pressure in the exterior of the box 41 is higher than the pressure in the box 41. This elastically deforms the deforming portion 45 of the pressure switch 200, as shown in FIG. 9, to dent toward the inner side of the peripheral wall 42. The deforming portion 45 thus separates from the terminal 36. In other words, the deforming portion 45 of the pressure switch 200 is deformed by the pressure (the absolute pressure) in the exterior of the box 41.

If the tire 14 bursts, the pressure in the tire 14 becomes equal to the atmospheric pressure. As a result, the deforming portion 45 comes into contact with the terminal 36 such that the warning signal is transmitted.

To employ the above-described pressure switch 200, a sudden-pressure-change transmission device using the pressure switch 200 is first manufactured. The deforming portion 45 and the terminal 36 are in contact with each other until the sudden-pressure-change transmission device is mounted in the wheel assembly 12. Therefore, the warning signal is continuously transmitted until the sudden-pressure-change transmission device is mounted in the wheel assembly 12, thus increasing consumption of the electric power of the battery 30. Contact between the deforming portion 45 and the terminal 36 may be prevented by maintaining an insulating material between the deforming portion 45 and the terminal 36 until the sudden-pressure-change transmission device is mounted in the wheel assembly 12. However, attachment and detachment of the insulating material is troublesome. Alternatively, locking may be performed to suspend transmission of the warning signal until the sudden-pressure-change transmission device is attached to the wheel assembly 12. Such locking is canceled after the sudden-pressure-change transmission device is mounted in the wheel assembly 12. In this case, a trigger device or the like must be used to selectively cause and cancel such locking, which is also troublesome.

In contrast, the sudden-pressure-change transmission device 20B of the present embodiment elastically deforms the deforming portion 45 in response to the pressure difference between the interior and the exterior of the box 41. Therefore, contact between the deforming portion 45 and the terminal 36 is considered unlikely in the period from when the sudden-pressure-change transmission device 20B is manufactured to when the sudden-pressure-change transmission device 20B is mounted in the wheel assembly 12. Even if the deforming portion 45 is elastically deformed and comes into contact with the terminal 36 before the sudden-pressure-change transmission device 20B is mounted in the wheel assembly 12, the deforming portion 45 elastically restores its original shape. This restrains continuous transmission of the warning signal for a prolonged period.

Accordingly, the above-described embodiment has the following advantages.

(1) The box 41 has the deforming portion 45. When the pressure in the box 41 is higher than the pressure in the tire 14 at least by the amount corresponding to the predetermined value, the deforming portion 45 elastically deforms. If a sudden pressure drop occurs in the tire 14, the pressure in the box 41 temporarily becomes higher than the pressure in the tire 14. Using such pressure increase, the deforming portion 45 is elastically deformed to contact the terminal 36. In response to contact between the deforming portion 45 and the terminal 36, the transmission circuit 34 transmits the warning signal to the tire pressure warning device 60. The tire pressure warning device 60 is thus caused to issue a warning. Since the warning signal is transmitted in response to elastic deformation of the deforming portion 45, a warning is issued immediately after the sudden pressure change.

(2) When the contact portion 46 and the terminal 36 come into contact with each other, the openings 49 of the passages 48 are blocked by the terminal 36. This limits gas discharge through the passages 48. As long as the contact portion 46 and the terminal 36 are in contact with each other, the pressure in the box 41 is unlikely to drop. This facilitates maintenance of the contact state between the contact portion 46 and the terminal 36, thus prolonging the time for which the warning signal is transmitted.

The time for which the contact portion 46 and the terminal 36 are in contact with each other may be prolonged by reducing the cross-sectional flow area of the passages 48. However, the reduced cross-sectional flow area of the passages 48 influences the pressure receiving area of the deforming portion 45 and the pressure difference between the interior and the exterior of the box 41 caused by a sudden pressure change. In this case, the deforming portion 45 may be deformed even by a slight pressure change. Therefore, there may be limitation in setting of the cross-sectional flow area of the passages 48. If the flow rate of the gas discharged through the passages 48 is limited only when the contact portion 46 and the terminal 36 are in contact with each other, the flow rate of the gas discharged through the passages 48 is reduced while the cross-sectional flow area of the passages 48 is maintained.

(3) The transmitter 20 includes the normal-time transmission device 20A in addition to the sudden-pressure-change transmission device 20B. The normal-time transmission device 20A transmits the data signal periodically, thus informing the tire pressure warning device 60 of the pressure in the tire 14. The normal-time transmission device 20A detects the pressure in the tire 14. Therefore, even when the pressure in the tire 14 slowly drops to an excessively low level, the normal-time transmission device 20A is capable of enabling warning. That is, the normal-time transmission device 20A is capable of detecting a problem of the tire 14 that is undetectable by the sudden-pressure-change transmission device 20B, thus causing the tire pressure warning device 60 to issue a warning. As a result, by employing the sudden-pressure-change transmission device 20B and the normal-time transmission device 20A in combination, warning is enabled not only when the tire 14 has a problem caused by a sudden pressure change but also when the pressure in the tire 14 slowly drops to an excessively low level.

(4) By shortening the obtainment interval of obtaining the pressure data from the pressure sensor 21, the tire pressure warning device 60 is enabled to issue a warning immediately after a sudden pressure change. However, the shortened obtainment interval increases consumption of the electric power of the battery 26. By using the sudden-pressure-change transmission device 20B, the tire pressure warning device 60 is enabled to issue a warning immediately after a sudden pressure change, without shortening the obtainment interval of the pressure data.

(5) By detecting a sudden pressure change in the tire 14 by means of the pressure switch 40, the sudden-pressure-change transmission device 20B is enabled to transmit the warning signal without employing a pressure sensor or a controller (a microcomputer). Consumption of the electric power of the battery 30 is thus smaller than that in a case employing the pressure sensor and the controller. Also, the weight of the sudden-pressure-change transmission device 20B is smaller than that in the case of employing the pressure sensor and the controller.

The above-described embodiment may be modified as follows.

The above-described embodiment has the sudden-pressure-change transmission device 20B dedicated to transmit the warning signal at the time of a sudden pressure change. However, the normal-time transmission device 20A may have a function of transmitting the warning signal. The transmitter 20 thus lacks the sudden-pressure-change transmission device 20B and includes only the normal-time transmission device 20A.

Figure 10:
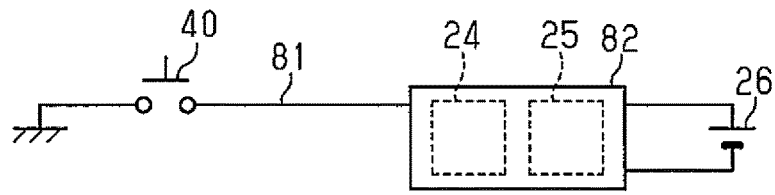
FIG. 10 illustrates an equivalent circuit representing a sudden-pressure-change transmission device of a modification.

In this case, as shown in FIG. 10, the controller 24 and the normal-time transmission circuit 25 of the normal-time transmission device 20A serve as a transmitting section. Specifically, the transmitting section is a component necessary for transmitting the warning signal. If, as described above regarding the above-described embodiment, transmission of the warning signal is accomplished only by the transmission circuit 34, the transmission circuit 34 serves as the transmitting section. If, as shown in FIG. 10, the data generated by the controller 24 is transmitted from the normal-time transmission circuit 25, the controller 24 and the normal-time transmission circuit 25 serve as the transmitting section.

A terminal 81 of a transmitting section 82 is an interrupt terminal. In this case, the deforming portion 45 comes into contact with the terminal 81 when the pressure in the box 41 becomes higher than the pressure in the tire 14 at least by the amount corresponding to the predetermined value. Such contact between the deforming portion 45 and the terminal 81 changes the voltage level, thus causing the controller 24 to perform an interrupt procedure. The interrupt procedure may be a procedure of transmitting a warning signal from the normal-time transmission device 20A. Alternatively, the interrupt procedure may be a procedure of obtaining the pressure data from the pressure sensor 21. After the pressure data is obtained from the pressure sensor 21, the transmitting section 82 transmits a pressure drop signal as the warning signal. In either case, when a sudden pressure change occurs, the tire pressure warning device 60 is caused to issue a warning in response to contact between the deforming portion 45 and the terminal 81.

In this case, a common transmission circuit can be employed as the transmission circuit for transmitting the warning signal and the transmission circuit for transmitting the data signal (the normal-time transmission circuit 25). Also, a common battery can be employed as the electric power supply for these transmission circuits. The transmitter 20 is thus reduced in size compared to the case in which the transmitter 20 includes both the normal-time transmission device 20A and the sudden-pressure-change transmission device 20B. In addition, this configuration facilitates checking of the operation of the transmitter 20 using a trigger device or the like.

Figure 11:
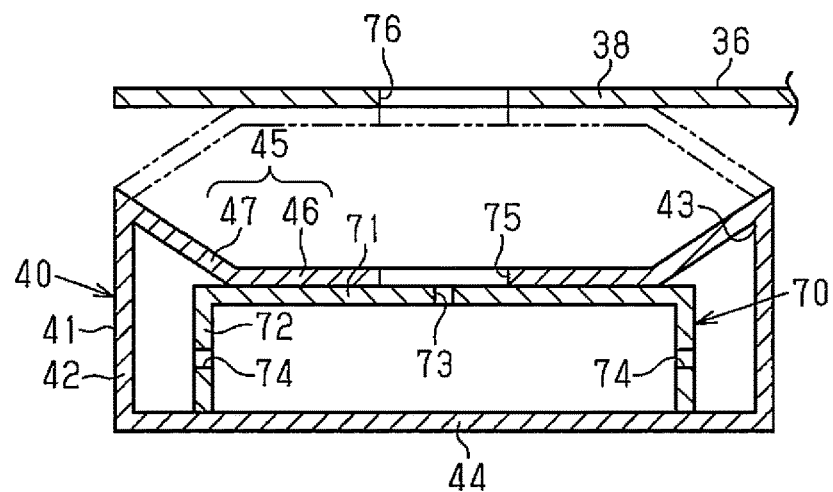
FIG. 11 is a cross-sectional view schematically showing a pressure switch of a modification.

As shown in FIG. 11, the pressure switch 40 may include an accommodated body 70 accommodated in the box 41. The accommodated body 70 functions as a flow rate limiting portion and includes a contacting portion 71 and a side wall 72. The contacting portion 71 comes into contact with the contact portion 46. The side wall 72 extends from the contacting portion 71 to the wall section 44. The accommodated body 70 includes a communication passage 73 and a through-hole 74. The communication passage 73 extends through the contacting portion 71. The through-hole 74 extends through the side wall 72. The communication passage 73 has a cross-sectional flow area smaller than that of a passage 75 arranged in the contact portion 46. When the contact portion 46 and the contacting portion 71 are in contact with each other, the communication passage 73 and the passage 75 communicate with each other.

The terminal 36 has a terminal passage 76 facing the passage 75. The cross-sectional flow area of the terminal passage 76 is greater than the cross-sectional flow area of the communication passage 73. Elastic deformation of the deforming portion 45 causes communication between the passage 75 and the terminal passage 76. When a sudden pressure drop occurs in the tire 14 and causes gas discharge from the box 41 through the passage 75, the gas discharged through the communication passage 73 is discharged through the passage 75. If the deforming portion 45 and the contacting portion 71 are in contact with each other, the flow rate of the gas discharged from the box 41 through the passage 75 depends on the cross-sectional flow area of the communication passage 73. In contrast, when the deforming portion 45 and the terminal 36 are in contact with each other, the passage 75 and the terminal passage 76 communicate with each other. In this state, the flow rate of the gas discharged through the passage 75 depends on the cross-sectional flow area of the terminal passage 76. The cross-sectional flow area of the terminal passage 76 is greater than the cross-sectional flow area of the communication passage 73. The flow rate of the gas discharged through the passage 75 is thus smaller when the deforming portion 45 and the terminal 36 are separate from each other than when the deforming portion 45 and the terminal 36 are in contact with each other. In other words, the accommodated body 70 and the terminal passage 76 function as a flow rate increasing portion.

A sudden pressure drop causes contact between the deforming portion 45 and the terminal 36. Such contact between the deforming portion 45 and the terminal 36 causes the flow rate of discharged gas to be smaller than that when the deforming portion 45 is in contact with the contacting portion 71. This promotes pressure drop in the box 41, thus restoring the original shape of the deforming portion 45. Such shape restoration of the deforming portion 45 causes contact between the deforming portion 45 and the contacting portion 71, thus reducing the flow rate of the gas discharged from the box 41. This promotes increase of the difference between the pressure in the tire 14 and the pressure in the box 41, thus elastically re-deforming the deforming portion 45. By repeating such operation, the deforming portion 45 repeatedly comes into contact with and separates from the terminal 36 in an alternating manner. Such contact and separation are alternately repeated at an interval that becomes shorter as the dropping amount of pressure per unit time becomes greater. The warning signal is transmitted each time the deforming portion 45 comes into contact with the terminal 36. That is, the interval at which the deforming portion 45 comes into contact with the terminal 36 and the interval at which the warning signal is transmitted are synchronous.

By receiving the warning signal, the reception controller 62 is enabled to issue a warning. Also, with reference to the interval at which the reception controller 62 receives the warning signal, the reception controller 62 obtains the degree of the problem that has occurred in the tire 14. The shorter the interval of warning signal reception, the more sudden pressure drop in the tire 14 becomes. Also, the interval of warning signal reception is used by the reception controller 62 to calculate the dropping amount (the drop rate) of pressure per unit time.

Figure 12:
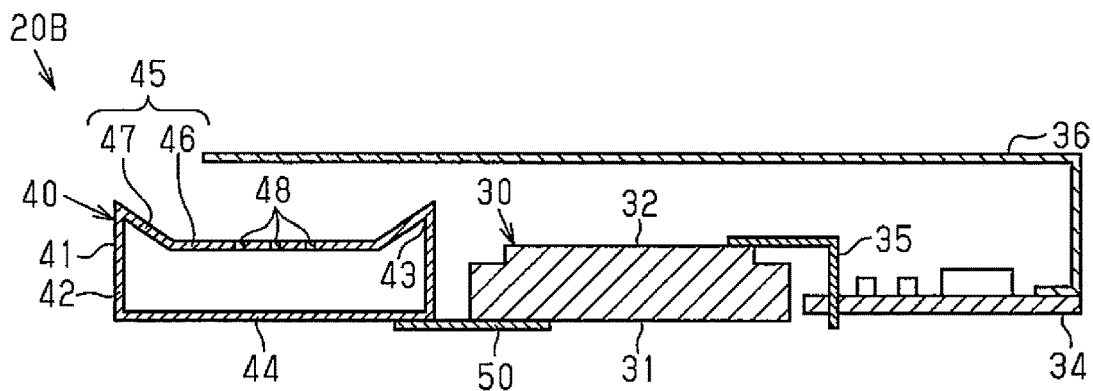
FIG. 12 is a cross-sectional view schematically showing a sudden-pressure-change transmission device of another modification.

The locations of the transmission circuit 34, the battery 30, and the pressure switch 40 may be changed as needed. For example, as shown in FIG. 12, the peripheral wall 42 and a side surface of the battery 30 may face each other, and another side surface of the battery 30 and the transmission circuit 34 may face each other.

Figure 13A:
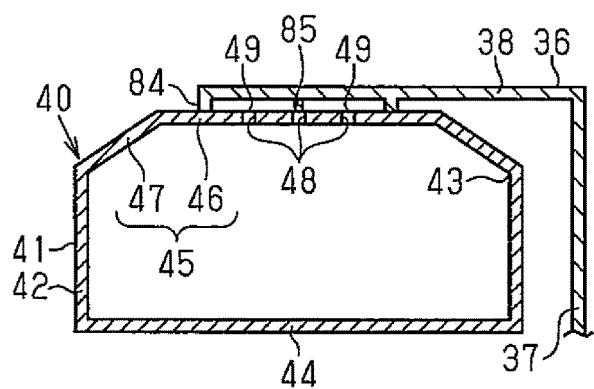
FIGS. 13A to 13D are cross-sectional views each schematically showing a pressure switch of a modification.

As shown in FIG. 13A, the terminal 36 may include a tubular portion 84 projecting from the second section 38 toward the contact portion 46. The tubular portion 84 extends from the terminal 36 toward the contact portion 46. A terminal passage 85 is arranged in a section of the tubular portion 84 to cause the interior and the exterior of the tubular portion 84 to communicate with each other. The cross-sectional flow area of the terminal passage 85 is smaller than the cross-sectional flow area of each passage 48.

The deforming portion 45 elastically deforms and comes into contact with the tubular portion 84. In this state, the passages 48 communicate with the range surrounded by the tubular portion 84 and the contact portion 46. The range and the interior of the tire 14 communicate with each other through the terminal passage 85. Since the cross-sectional flow area of the terminal passage 85 is smaller than the cross-sectional flow area of each passage 48, the flow rate of the gas discharged through the passages 48 is small when the deforming portion 45 and the contact portion 46 are in contact with each other. In this case, the tubular portion 84 and the terminal passage 85 function as a flow rate reducing portion.

Figure 13B:
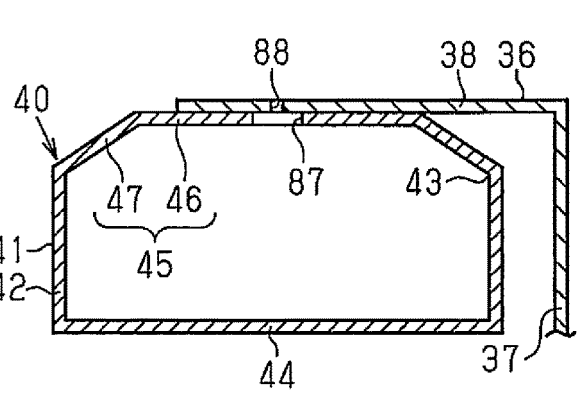

As shown in FIG. 13B, the terminal 36 may include a terminal passage 88 having a cross-sectional flow area smaller than the cross-sectional flow area of a passage 87 arranged in the contact portion 46. The terminal passage 88 is located at such a position where, when the deforming portion 45 and the terminal 36 come into contact with each other, the terminal passage 88 communicates with the passage 87. In this case, the terminal passage 88 functions as a flow rate reducing portion to reduce the flow rate of the gas discharged through the passage 87 when the deforming portion 45 and the terminal 36 are in contact with each other.

Figure 13C:
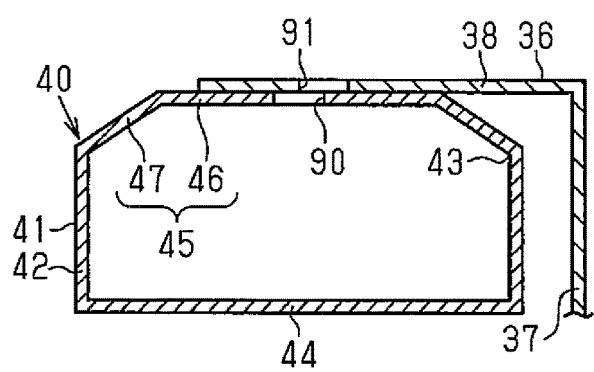

As shown in FIG. 13C, the terminal 36 may have a terminal passage 91. When the deforming portion 45 and the terminal 36 come into contact with each other, the terminal passage 91 becomes overlapped with a section of a passage 90 arranged in the contact portion 46. The terminal passage 91 has a cross-sectional flow area not less than the cross-sectional flow area of the passage 90. The area by which the terminal passage 91 and the passage 90 are overlapped with each other when the deforming portion 45 is in contact with the terminal 36 is less than the cross-sectional flow area of the passage 90. Therefore, the terminal passage 91 functions as a flow rate reducing portion to reduce the flow rate of the gas discharged through the passage 90 when the deforming portion 45 and the contact portion 46 are in contact with each other.

Figure 13D:
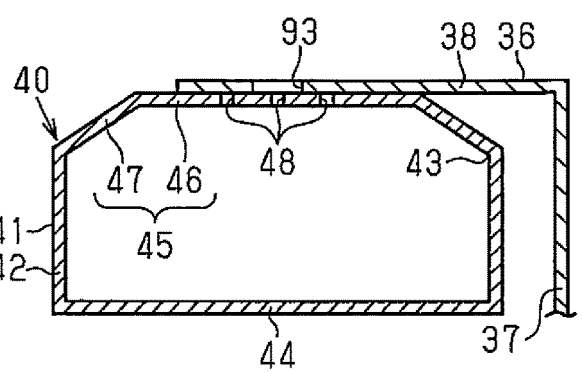

As shown in FIG. 13D, the terminal 36 may include a terminal passage 93. When the deforming portion 45 and the terminal 36 come into contact with each other, the terminal passage 93 communicates with some of the passages 48 arranged in the contact portion 46. The terminal passage 93 functions as a flow rate reducing portion to reduce the flow rate of the gas discharged through the passages 48 when the deforming portion 45 and the contact portion 46 are in contact with each other.

Figure 14:
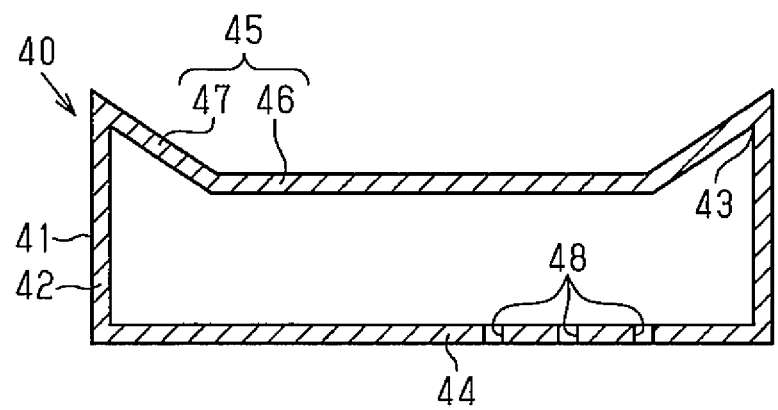
FIG. 14 is a cross-sectional view schematically showing a sudden-pressure-change transmission device of another modification.

As shown in FIG. 14, the passages 48 may be arranged in the wall section 44. Alternatively, the passages 48 may be arranged in either the peripheral wall 42 or the retractable portion 47.

Figure 15:
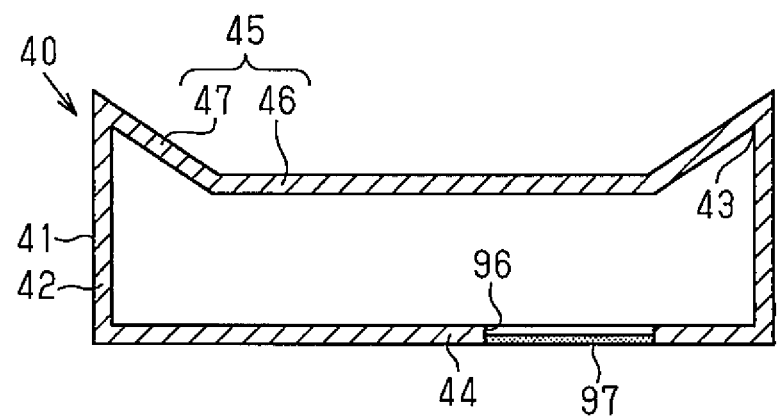
FIG. 15 is a cross-sectional view schematically showing a sudden-pressure-change transmission device of another modification.

As shown in FIG. 15, a passage 96 of the pressure switch 40 may have an air-permeable filter 97. Since the filter 97 causes pressure loss, the air permeability of the filter 97 is taken into consideration when setting the cross-sectional flow area of the passage 96.

The transmitter 20 may be attached to the wheel assembly in any manners. For example, the transmitter 20 may be bonded to the tire 14.

The transmitter 20 may be configured to include the sudden-pressure-change transmission device 20B but not the normal-time transmission device 20A. Even in this case, when a sudden pressure change occurs in the tire 14, the warning signal transmitted by the sudden-pressure-change transmission device 20B causes the warning device 65 to issue a warning. Further, since the sudden-pressure-change transmission device 20B transmits the warning signal temporarily at the time of a sudden pressure change, the sudden-pressure-change transmission device 20B transmits signals less frequently than the normal-time transmission device 20A. Therefore, the sudden-pressure-change transmission device 20B consumes less electric power than the normal-time transmission device 20A. This prolongs the life of the transmitter 20 if a battery with the capacity equal to that of the battery 26 of the normal-time transmission device 20A is used as the battery 30 of the sudden-pressure-change transmission device 20B.

Also, the sudden-pressure-change transmission device 20B has a smaller number of components than the normal-time transmission device 20A. This reduces the cost for manufacturing the transmitter 20.

The box 41 may have any shape as long as the box 41 has a deforming portion and the deforming portion is deformable by the pressure difference between the interior and the exterior of the box 41. For example, the peripheral wall 42 may have a rectangular tubular shape.

The deforming portion does not necessarily have to be made of metal as long as the deforming portion is conductive and elastically deformable. For example, the deforming portion may be made of elastically deformable conductive plastic or made of an elastically deformable plastic material having a metal-plated or conductive-coated surface or an elastically deformable plastic material having a metal mesh attached thereto. The deforming portion does not necessarily have to be conductive as a whole, if it is conductive at least in the section that contacts the terminal 36. Compared to a deforming portion made of metal, the listed deforming portions are light-weighted and enable shape setting with improved flexibility. Further, these deforming portions are easier to machine than a deforming portion made of metal.

The passages 48 may be replaced by a single passage 48.

The wall section 44 of the pressure switch 40 and the end face 32 of the battery 30 may be in direct contact with each other. In this case, the conductive member 50 is not employed.

The peripheral wall 42 and the wall section 44 of the pressure switch 40 may be made of any material other than metal, such as plastic. That is, at least the deforming portion 45 of the pressure switch 40 must be made of metal.

Figure 16:
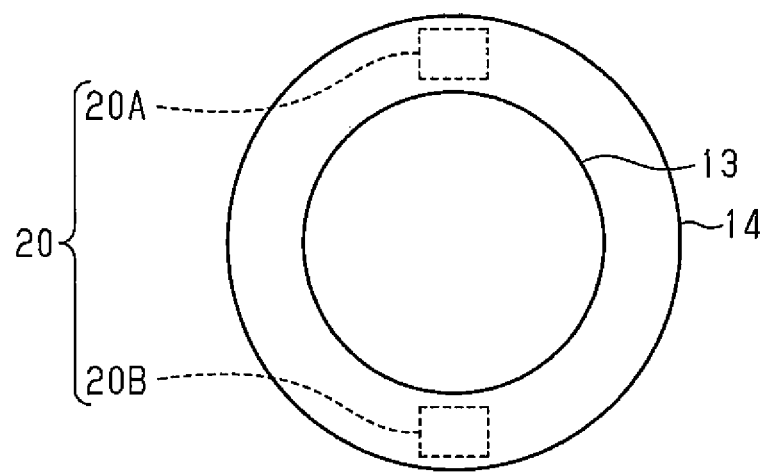
FIG. 16 is a perspective view showing a transmitter of another modification.

The normal-time transmission device 20A and the sudden-pressure-change transmission device 20B do not necessarily have to be integrated with each other but may be attached to the wheel assembly 12 independently from each other as shown in FIG. 16. For example, the normal-time transmission device 20A and the sudden-pressure-change transmission device 20B may each be attached to the wheel assembly 12 by being integrated with the tire valve 16 or being bonded to the inner side of the wheel 13 or the inner side of the tire 14. That is, the normal-time transmission device 20A and the sudden-pressure-change transmission device 20B may be attached at any site as long as the transmission devices 20A, 20B are arranged in the tire 14 and capable of detecting the pressure in the tire 14. Specifically, by attaching the normal-time transmission device 20A and the sudden-pressure-change transmission device 20B at opposite positions with respect to the rotation axis of the wheel 13, a light-weighted balance weight can be employed for balance adjustment of the tire 14.

The tire pressure warning device may be any device as long as the device has a function of receiving a warning signal and a function of issuing a warning, such as a portable terminal carried by an occupant of the vehicle.

The vehicle may be a motorcycle or a vehicle having five or more wheel assemblies.

Signals of the 2.4 GHz band may be used as the data signal, the pressure drop signal, and the warning signal.

The data signal does not necessarily have to carry the temperature data. In this case, the normal-time transmission device 20A may lack the temperature sensor 22.

The transmitter 20 may transmit the data signal at a constant position (for example, the lowermost position). Based on the correlative relationship between the timing at which the reception controller 62 receives the data signal from the transmitter 20 and the rotation angle of the wheel assembly 12 at the time of reception of the data signal, the reception controller 62 may determine which of the wheel assemblies 12 the transmitter 20 is mounted in (autolocation). Specifically, the rotation angle of the wheel assembly 12 is obtained from an anti-lock braking system (ABS). In this case, by employing a common ID code for each normal-time transmission device 20A and the associated sudden-pressure-change transmission device 20B, the receiver 61 can determine which of the wheel assemblies 12 the sudden-pressure-change transmission device 20B that has transmitted the data signal is mounted in. That is, the receiver 61 can determine which of the tires 14 of the wheel assemblies 12 has a problem. Specifically, even if each normal-time transmission device 20A and the associated sudden-pressure-change transmission device 20B employ different ID codes, the same effect as the above-described effect is obtained by memorizing the ID codes as associated with each other in the reception-side memory section 62b.

The box 41 or the terminal 35, 36 may be used as an antenna of the transmission circuit 34.

DESCRIPTION OF THE REFERENCE NUMERALS

14 . . . Tire, 20 . . . Transmitter, 34 . . . Transmission Circuit (Transmitting Section), 36 . . . Terminal (Flow Rate Reducing Portion), 40 . . . Pressure Switch, 41 . . . Box, 45 . . . Deforming Portion, 48 . . . Passage, 60 . . . Tire Pressure Warning Device

The invention claimed is:

1. A transmitter adapted to be arranged in a tire to cause a tire pressure warning device to issue a warning, the transmitter comprising:
   a transmitting section, which has a terminal; and
   a pressure switch, wherein
   the pressure switch includes a hollow box and a passage that causes an interior of the box and an interior of the tire to communicate with each other,
   the box includes a conductive deforming portion, which is configured to be separate from the terminal of the transmitting section when a difference between a pressure in the box and a pressure in the tire is less than a predetermined value and to be elastically deformed to contact the terminal when the pressure in the box is higher than the pressure in the tire at least by the predetermined value,
   the transmitting section is configured to transmit a warning signal that causes the tire pressure warning device to issue a warning in response to contact between the deforming portion and the terminal, and
   a cross-sectional flow area of the passage is configured to, in a state in which the pressure in the tire is lower than the pressure in the box, be changed between when the deforming position and the terminal are in contact with each other and when the deforming position and the terminal are separate from each other.

2. The transmitter according to claim 1, further comprising a flow rate reducing portion, which is configured to, in a state in which the pressure in the tire is lower than the pressure in the box, cause a flow rate of gas discharged from the box through the passage to be smaller when the deforming portion and the terminal are in contact with each other than when the deforming portion and the terminal are separate from each other.

3. The transmitter according to claim 1, wherein
   the passage is provided in the deforming portion, and
   the terminal is configured to limit the flow rate of the gas discharged from the box through the passage when the terminal contacts the deforming portion.

4. The transmitter according to claim 1, further comprising a flow rate increasing portion, which is configured to, in a state in which the pressure in the tire is lower than the pressure in the box, cause a flow rate of gas discharged from the box through the passage to be smaller when the deforming portion and the terminal are separate from each other than when the deforming portion and the terminal are in contact with each other.

5. The transmitter according to claim 4, wherein
the passage is provided in the deforming portion, and
the flow rate increasing portion includes a flow rate limiting portion arranged in the box, and
the flow rate limiting portion is configured to limit the flow rate of the gas discharged from the box through the passage when the deforming portion and the terminal are separate from each other.

\* \* \* \* \*